United States Patent
Kondo et al.

(10) Patent No.: US 9,526,060 B2
(45) Date of Patent: Dec. 20, 2016

(54) AD HOC NETWORK SYSTEM AND ROUTE SELECTION METHOD

(71) Applicant: FUJITSU LIMITED, Kawasaki-shi, Kanagawa (JP)

(72) Inventors: Taiji Kondo, Chiba (JP); Takao Ito, Kawasaki (JP); Katsumi Kobayashi, Tokyo (JP); Takahiro Koharagi, Tokyo (JP); Hiroaki Kawasumi, Tokyo (JP); Mitsuaki Yasuoka, Tokyo (JP); Yosuke Nishikata, Tokyo (JP); Shigemasa Matsubara, Tokyo (JP); Yoshihiko Shirokura, Tokyo (JP)

(73) Assignee: FUJITSU LIMITED, Kawasaki (JP)

( * ) Notice: Subject to any disclaimer, the term of this patent is extended or adjusted under 35 U.S.C. 154(b) by 171 days.

(21) Appl. No.: 14/474,661

(22) Filed: Sep. 2, 2014

(65) Prior Publication Data

US 2014/0369235 A1   Dec. 18, 2014

Related U.S. Application Data (63) Continuation of application No. PCT/JP2013/055748, filed on Mar. 1, 2013.

(30) Foreign Application Priority Data

Mar. 2, 2012   (JP) ................. 2012-047359

(51) Int. Cl.
*H04W 40/02*   (2009.01)
*H04L 12/24*   (2006.01)
(Continued)

(52) U.S. Cl.
CPC .............. *H04W 40/02* (2013.01); *H04L 41/12* (2013.01); *H04L 45/122* (2013.01); *H04L 45/20* (2013.01); *H04W 84/22* (2013.01)

(58) Field of Classification Search
CPC ...... H04W 40/00; H04W 40/02; H04W 40/04; H04W 40/12; H04W 40/18; H04W 40/205; H04W 40/24; H04W 40/246; H04W 40/248; H04W 40/34; H04W 40/38
See application file for complete search history.

(56) References Cited

U.S. PATENT DOCUMENTS

| | | | |
|---|---|---|---|
| 7,177,295 B1* | 2/2007 | Sholander | H04L 45/30 370/338 |
| 8,699,377 B2* | 4/2014 | Veillette | H04L 45/34 370/254 |

(Continued)

FOREIGN PATENT DOCUMENTS

| | | |
|---|---|---|
| JP | 2009-515473 | 4/2009 |
| JP | 2010-178145 | 8/2010 |

(Continued)

OTHER PUBLICATIONS

International Search Report mailed Apr. 16, 2013 in corresponding application PCT/JP2013/055748.

*Primary Examiner* — Ashley Shivers
(74) *Attorney, Agent, or Firm* — Staas & Halsey LLP (57) ABSTRACT

An ad hoc network system includes a plurality of nodes that communicate with a specific node. Each of the nodes includes a calculator and a selector. The calculator calculates a cumulative value of the number of communication nodes connected through the node by adding the numbers of communication nodes from an upstream side, which is a side closer to the specific node than the node, to the node. The selector selects a node serving as a connection destination out of the nodes located on the upstream side on the basis of the cumulative value of the number of communication nodes calculated by the calculator.

4 Claims, 7 Drawing Sheets

(51) Int. Cl.
*H04L 12/733* (2013.01)
*H04W 84/22* (2009.01)

(56) References Cited

U.S. PATENT DOCUMENTS

| | | | |
|---|---|---|---|
| 2004/0090943 A1* | 5/2004 | da Costa | H04L 41/0806 370/338 |
| 2009/0135824 A1 | 5/2009 | Liu | |
| 2010/0195560 A1 | 8/2010 | Nozaki et al. | |
| 2010/0246473 A1 | 9/2010 | Brand | |
| 2011/0063999 A1* | 3/2011 | Erdmann | H04W 84/18 370/254 |
| 2011/0231573 A1* | 9/2011 | Vasseur | H04L 45/48 709/238 |
| 2011/0249612 A1 | 10/2011 | Kubo et al. | |
| 2012/0230222 A1* | 9/2012 | Shaffer | H04L 41/12 370/254 |
| 2012/0320781 A1 | 12/2012 | Furukawa et al. | |
| 2013/0227055 A1* | 8/2013 | Vasseur | H04L 41/145 709/217 |

FOREIGN PATENT DOCUMENTS

| | | |
|---|---|---|
| JP | 2010-233209 | 10/2010 |
| JP | 2011-223394 | 11/2011 |
| WO | WO 2011/105371 | 9/2011 |

\* cited by examiner

| DESTINATION | TRANSFER DESTINATION | NUMBER OF HOPS | ΣB |
|---|---|---|---|

| DESTINATION | TRANSFER DESTINATION | NUMBER OF HOPS | ΣB | PRIORITY ORDER |
|---|---|---|---|---|
| GW1 | NODE 100f | 4 | 11 | 1 |
| GW1 | NODE 100g | 3 | 13 | 2 |

| NUMBER OF HOPS EXECUTING PATH CONCENTRATION AVOIDANCE | NUMBER OF GROUP EXECUTING PATH CONCENTRATION AVOIDANCE | NUMBER OF GROUPS EXECUTING PATH CONCENTRATION AVOIDANCE |
|---|---|---|

FIG.9

| N | NUMBER OF HOPS EXECUTING PATH CONCENTRATION AVOIDANCE | NUMBER OF GROUP EXECUTING PATH CONCENTRATION AVOIDANCE | NUMBER OF GROUPS EXECUTING PATH CONCENTRATION AVOIDANCE |
|---|---|---|---|
| 1 | 13 | 0 | 5 |
| 2 | 11 | 1 | 6 |
| ⋮ | ⋮ | ⋮ | ⋮ |
| 100 | 5 | 3 | 7 |

AD HOC NETWORK SYSTEM AND ROUTE SELECTION METHOD

CROSS-REFERENCE TO RELATED APPLICATION

This application is a continuation of International Application No. PCT/JP2013/055748, filed on Mar. 1, 2013 which claims the benefit of priority of the prior Japanese Patent Application No. 2012-047359, filed on Mar. 2, 2012, the entire contents of which are incorporated herein by reference.

FIELD

The embodiment discussed herein is directed to an ad hoc network system and a route selection method.

BACKGROUND

There have been ad hoc network systems that include a plurality of nodes communicating with gateways (GWs) that are specific nodes serving as windows for external servers. In the ad hoc network system, the respective nodes form communication routes by relaying packets received from the adjacent nodes to other nodes.

A conventional technique is described that forms the communication routes of the packets. In the conventional technique, respective nodes calculate evaluation values of the multiple communication routes to a specific node such as a GW using evaluation parameters such as the number of hops of the packets and reception levels. The respective nodes then select the communication routes to the specific node on the basis of the respective calculated evaluation values. A conventional technology is described in Japanese Laid-open Patent Publication No. 2011-223394, for example.

The conventional technique, however, has a problem in that when the ad hoc network system is applied to a tree structure with a GW as the root, a traffic load may be concentrated on an aggregate section located on an upstream side in the tree structure.

SUMMARY

According to an aspect of an embodiment, an ad hoc network system includes a plurality of nodes that communicate with a specific node. Each of the nodes includes a calculator that calculates a cumulative value of number of communication nodes connected through the node by adding numbers of communication nodes from an upstream side to the node, the upstream side being a side closer to the specific node than the node, and a selector that selects a node serving as a connection destination out of the nodes located on the upstream side on the basis of the cumulative value of the number of communication nodes calculated by the calculator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiment of the present invention will be explained with reference to accompanying drawings. The embodiment does not limit the disclosed technique.

Figure 1:
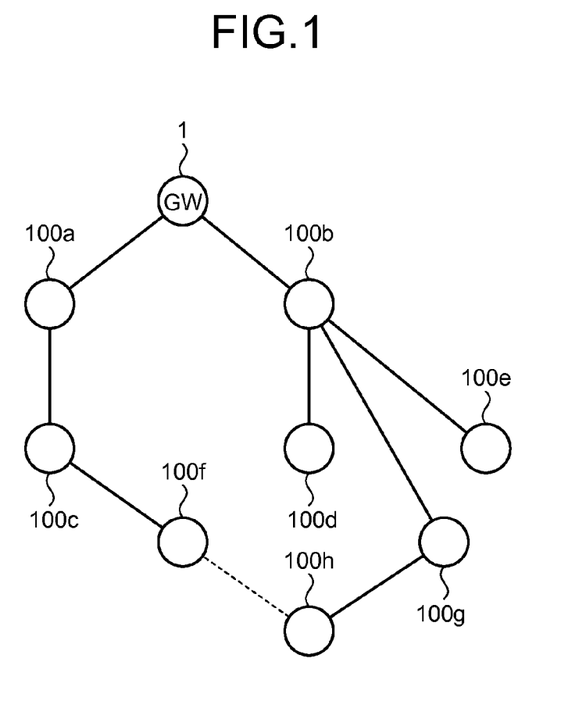
FIG. 1 is a schematic diagram illustrating a structure of an ad hoc network system according to an embodiment.

The following describes a structure of the ad hoc network system according to the embodiment. FIG. 1 is a schematic diagram illustrating a structure of the network system according to the embodiment. As illustrated in FIG. 1, the ad hoc network system according to the embodiment includes a GW1 and nodes 100*a* to 100*h*. The GW1 is an example of the specific node. The GW1 and the nodes 100*a* to 100*h* are connected in such a manner that the adjacent nodes are wirelessly connected. For example, the GW1 is connected to the nodes 100*a* and 100*b*. As a result, the GW1 and the nodes 100*a* to 100*h* form a tree structure with the GW1 as the root. In the embodiment, the nodes 100*a* to 100*h* may be described as the node 100 when the nodes 100*a* to 100*h* are not particularly differentiated from one another. A side closer to the GW1 than the node 100 may be described as an upstream side of the node 100, while a side further from the GW1 than the node 100 may be described as a downstream side of the node 100.

The node 100 establishes a communication route by transmitting and receiving a hello packet. The node 100 calculates an accumulated value of the number of nodes connected through the node 100 by adding the numbers of nodes from the upstream side of the node 100 when establishing the communication route. The nodes connected through the node 100, in other words, mean the nodes located on the downstream side of the node 100. Hereinafter, the number of nodes located on the downstream side of the node 100 is described as the number of communication nodes, while a value obtained by accumulating the numbers of communication nodes of the node 100 is described as a cumulative value of the number of communication nodes.

The node 100 selects a node serving as a connection destination out of the nodes located on the upstream side of the node 100 on the basis of the calculated cumulative value of the number of communication nodes, and transfers data.

Figure 2:
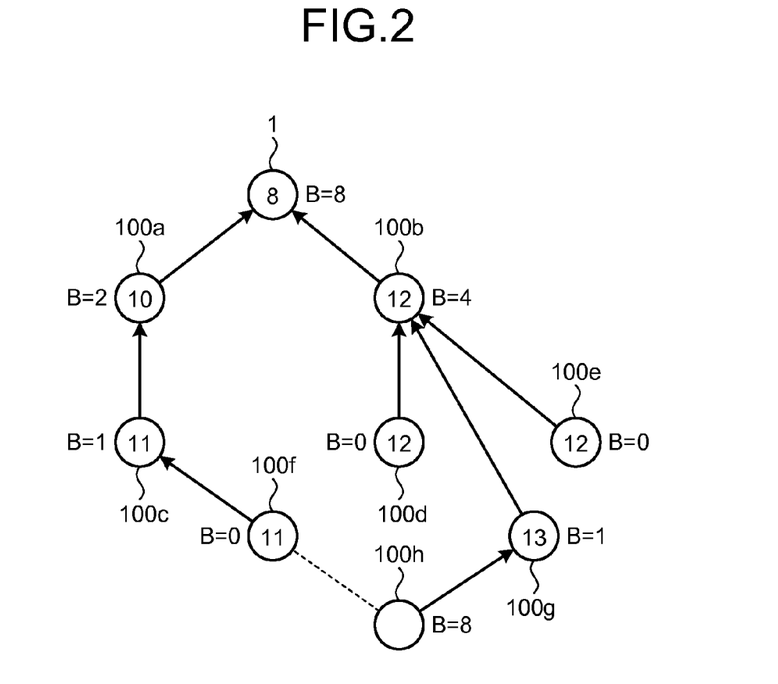
FIG. 2 is a first schematic diagram to explain an example of processing in which a node in the embodiment selects a route.
Figure 3:
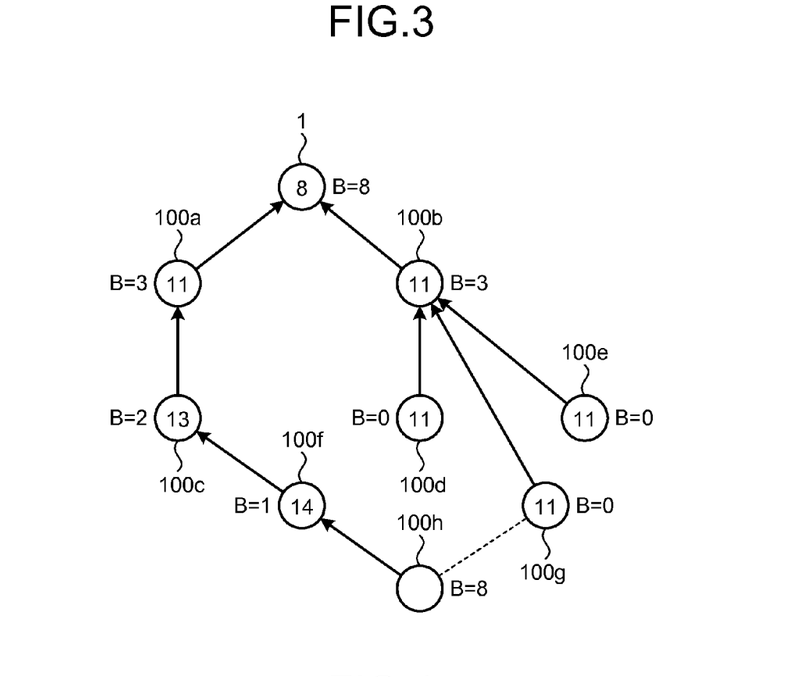
FIG. 3 is a second schematic diagram to explain an example of the processing in which the node in the embodiment selects the route.

The following describes an example of processing in which the node 100 illustrated in FIG. 1 selects a route. FIGS. 2 and 3 are schematic diagrams to explain an example of the processing in which the node in the embodiment selects the route. In FIGS. 2 and 3, B that is written near the GW1 and each node 100 represents the number of communication nodes while a number written inside each node 100 represents the cumulative value of the number of communication nodes from the upstream side to the node 100.

The node 100 calculates the cumulative value of the number of communication nodes from the upstream side to the node 100 on the basis of information included in the hello packet when transmitting the hello packet to and receiving the hello packet from the adjacent node. In the example illustrated in FIG. 2, the node 100a adds the number of communication nodes of the node 100a "2" to the number of communication nodes of the GW1 "8", which is included in the hello packet, to calculate the cumulative value "10" of the number of communication nodes from the upstream side to the node 100a. The node 100b adds the number of communication nodes of the node 100b "4" to the number of communication nodes of the GW1 "8", which is included in the hello packet, to calculate the cumulative value "12" of the number of communication nodes from the upstream side to the node 100b. The node 100c adds the number of communication nodes of the node 100c "1" to the cumulative value "10" of the number of communication nodes from the upstream side to the node 100a, which is included in the hello packet, to calculate the cumulative value "11" of the number of communication nodes from the upstream side to the node 100c. Likewise, the node 100d calculates the cumulative value "12" of the number of communication nodes from the upstream side to the node 100d. The node 100e calculates the cumulative value "12" of the number of communication nodes from the upstream side to the node 100e. The node 100f calculates the cumulative value "11" of the number of communication nodes from the upstream side to the node 100f. The node 100g calculates the cumulative value "13" of the number of communication nodes from the upstream side to the node 100g.

The node 100, then, selects the node serving as the connection destination out of the nodes located on the upstream side of the node 100 on the basis of the calculated cumulative value of the number of communication nodes. For example, in the example illustrated in FIG. 2, the cumulative value "13" of the number of communication nodes corresponding to the node 100g is larger than the cumulative value "11" of the number of communication nodes corresponding to the node 100f. This means that a traffic load concentrated on the node in an aggregate section located on the upstream side of the node 100g (e.g., the node 100b) is larger than the traffic load concentrated on the node in the aggregate section located on the upstream side of the node 100f (e.g., the node 100a). Thus, as illustrated in FIG. 3, the node 100h located on the downstream side of the nodes 100f and 100g selects the node 100f, which has a lower traffic load on the upstream side, as the connection destination out of the nodes 100g and 100f that are located on the upstream side, and transfers the data.

A conventional technique that selects a communication route on the basis of the number of hops performs the following processing. The number of hops on the route from the node 100h to the GW1 through the node 100g is "3" while the number of hops on the route from the node 100h to the GW1 through the node 100f is "4". The node 100h, thus, selects the node 100g on the basis of the smaller number of hops. A traffic load, however, is concentrated on the aggregate section located on the upstream side of the node 100g (e.g., the node 100b). As a result, the selection of the node 100g, which is made by the conventional technique, may cause an increase in traffic load on the upstream side of the tree structure with the GW1 as the root and the occurrence of a communication failure, for example.

In the embodiment, however, the node 100h selects the node serving as the connection destination on the basis of the cumulative value of the number of communication nodes instead of the number of hops. The node 100h selects the node 100f, which has a lower traffic load on the upstream side, as the connection destination and transfers the data to the node 100f.

In the ad hoc network system in the embodiment, as described above, each node calculates the cumulative value of the number of communication nodes from the upstream side to the node and selects a connection destination out of the nodes on the upstream side on the basis of the cumulative value of the number of communication nodes. As a result, the ad hoc network system in the embodiment can distribute the traffic load on the aggregate section located on the upstream side of the tree structure with the GW as the root.

Figure 4:
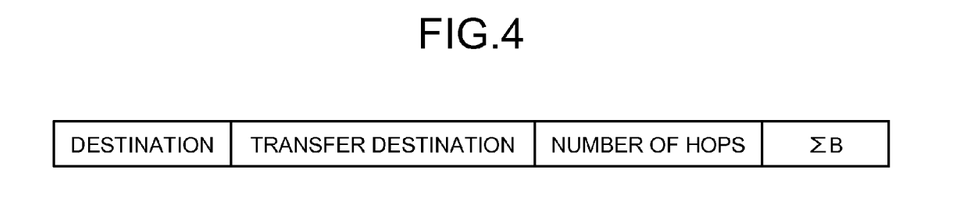
FIG. 4 is a schematic diagram illustrating an example of a data structure of a hello packet in the embodiment.

The following describes a data structure of the hello packet transmitted and received by the node 100. FIG. 4 is a schematic diagram illustrating an example of a data structure of the hello packet in the embodiment. As illustrated in FIG. 4, the hello packet in the embodiment includes a destination, a transfer destination, the number of hops, and ΣB. The "destination" stores therein an address of the node (e.g., the GW) serving as the destination in the communication route. The "transfer destination" stores therein the address of the adjacent node serving as a transmission origin of the hello packet. The "number of hops" stores therein the number of hops from the node serving as the "destination" of the hello packet to the node serving as the "transfer destination". The "ΣB" stores therein the cumulative value of the number of communication nodes B from the node serving as the "destination" of the hello packet to the node serving as the "transfer destination".

Figure 5:
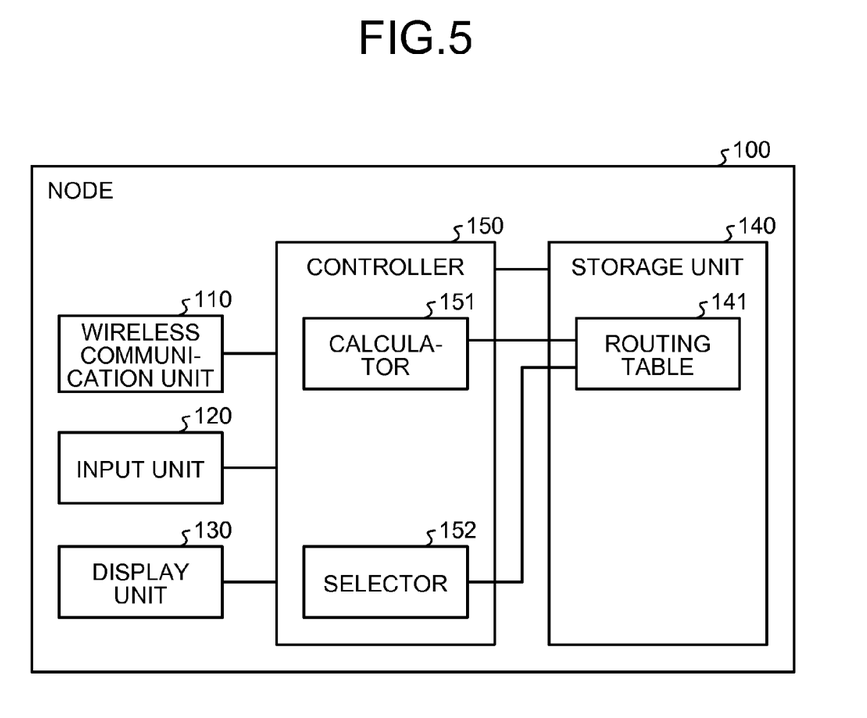
FIG. 5 is a functional block diagram illustrating a structure of the node according to the embodiment.

The following describes a structure of the node 100 illustrated in FIG. 1. FIG. 5 is a functional block diagram illustrating a structure of the node according to the embodiment. As illustrated in FIG. 5, the node 100 includes a wireless communication unit 110, an input unit 120, a display unit 130, a storage unit 140, and a controller 150.

The wireless communication unit 110 is a device that performs wireless data communication with the adjacent node. For example, the wireless communication unit 110 is a wireless link module. The controller 150 transmits and receives the hello packet between itself and the adjacent node through the wireless communication unit 110, for example.

The input unit 120 is an input device that is used for inputting various types of information to the node 100. For example, the input unit 120 is a keyboard, a mouse, or a touch panel. The display unit 130 is a display device that displays various types of information. For example, the display unit 130 is a display or a touch panel.

The storage unit 140 stores therein a routing table 141, for example. The storage unit 140 is a semiconductor memory element such as a random access memory (RAM), a read only memory (ROM), or a flash memory, or a storage device such as a hard disk drive or an optical disc drive.

Figure 6:
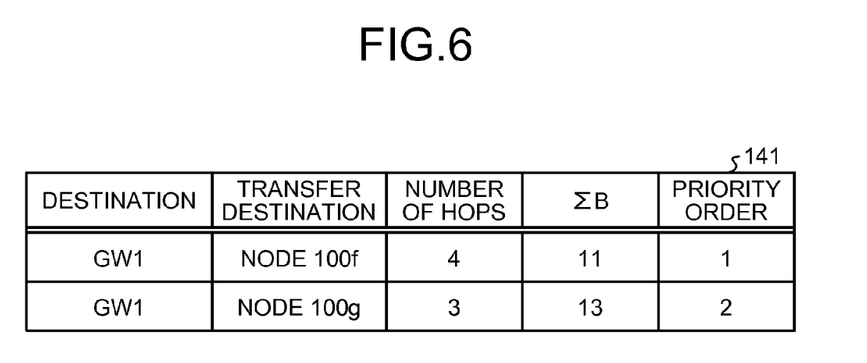
FIG. 6 is a schematic diagram illustrating an example of a data structure of a routing table according to the embodiment.

The routing table 141 is a table that stores therein information about the communication routes. FIG. 6 is a schematic diagram illustrating a data structure of the routing table. As illustrated in FIG. 6, the routing table 141 stores therein the destination, the transfer destination, the number of hops, the ΣB, and a priority order in association with one another.

In FIG. 6, the destination presents the destination of the packet. The transfer destination represents the connection destination when the packet is transmitted to the destination, in other words, presents the transfer destination when the packet is transmitted to the destination. The number of hops represents the number of hops from the node to the node serving as the destination through the node serving as the transfer destination. The ΣB represents the cumulative value of the number of communication nodes from the node to the node serving as the destination through the node serving as the transfer destination.

The ΣB is an evaluation value that represents a level of the traffic load concentrated on another node in the aggregate section located on the upstream side of the node on the communication route and used when a plurality of communication routes are available to the same destination. For example, in FIG. 6, two communication routes are available to the destination "GW1". Specifically, one communication route having the "node 100*f*" serving as the transfer destination and the other communication route having the "node 100*g*" serving as the transfer destination are available. In the example, the ΣB of the communication route having the "node 100*g*" serving as the transfer destination is "11" while the ΣB of the communication route having the "node 100*f*" serving as the transfer destination is "13". The traffic load concentrated on another node in the aggregate section located on the upstream side of the node is larger in the communication route having the "node 100*g*" serving as the transfer destination than that in the other communication route.

The priority order represents the order in priority of the communication routes when the multiple communication routes to the same destination are available. For example, in FIG. 6, one communication route having the "node 100*f*" serving as the transfer destination and the other communication route having the "node 100*g*" serving as the transfer destination are available. In this case, the priority order of the communication route having the "node 100*f*" serving as the transfer destination is "1" while the priority order of the communication route having the "node 100*g*" serving as the transfer destination is "2". The communication route having the "node 100*f*" serving as the transfer destination has a higher priority order than that of the other route.

The controller 150 includes a calculator 151 and a selector 152. For example, the controller 150 is an integrated device such as an application specific integrated circuit (ASIC) or a field programmable gate array (FPGA). The controller 150 is an electronic circuit such as a central processing unit (CPU) or a micro processing unit (MPU), for another example.

The calculator 151 calculates the cumulative value of the number of communication nodes from the node serving as the destination to the node 100 through the adjacent node when transmitting and receiving the hello packet between itself and the adjacent node, and updates the routing table 141.

Figure 7:
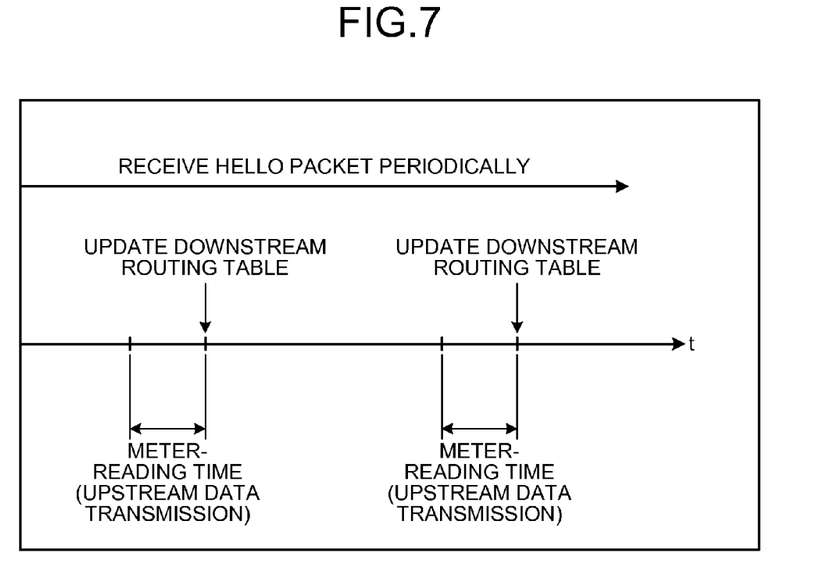
FIG. 7 is a schematic diagram to explain an example of processing in which a calculator in the embodiment calculates a cumulative value of the number of communication nodes.

The following describes an example of the processing in which the calculator 151 calculates the cumulative value of the number of communication nodes. FIG. 7 is a schematic diagram to explain an example of the processing in which the calculator in the embodiment calculates the cumulative value of the number of communication nodes. In FIG. 7, the abscissa axis represents a time t. As illustrated in FIG. 7, the calculator 151 counts the number of entries in a downstream routing table that is updated every upstream data transmission of a meter-reading time to detect the number of nodes located on the downstream side of the node 100 as the number of communication nodes of the node 100. The calculator 151 receives the hello packet periodically sent from the adjacent node and calculates the cumulative value of the number of communication nodes from the node serving as the destination to the node 100 through the adjacent node on the basis of the information included in the hello packet and the detected number of communication nodes of the node 100. Specifically, the calculator 151 receives the hello packet and adds the value of the detected number of communication nodes of the node 100 to the value of the ΣB of the hello packet to calculate the cumulative value of the number of communication nodes from the destination to the node 100.

When receiving the hello packet, the calculator 151 updates the routing table 141 on the basis of the information included in the hello packet and the calculated cumulative value of the number of communication nodes.

The following describes an example of processing in which the calculator 151 updates the routing table 141. The calculator 151 receives the hello packet and sets the destination included in the hello packet to the destination in the routing table 141. The calculator 151 sets the node serving as the transmission origin of the hello packet to the transfer destination in the routing table 141. The calculator 151 sets the value obtained by adding one to the value of the number of hops of the hello packet to the number of hops in the routing table 141. The calculator 151 sets the cumulative value of the number of communication nodes, which is calculated by the processing described above, to the ΣB in the routing table 141.

The selector 152 is a processor that sets the priority order for each destination on the basis of the routing table 141 and selects the route to which the packet is transferred.

The following describes the processing in which the selector 152 sets the priority order. The selector 152 refers to the routing table 141 and compares the values of the ΣB with one another for each same destination. The selector 152 allocates values in ascending order from the record having the smallest value of the ΣB as the priority orders. In the example illustrated in FIG. 6, the first and the second rows have the same destination "GW1" and the value of the ΣB in the second row is larger than that in the first row. On the basis of the values, the selector 152 determines that the communication route having the node "100*g*" serving as the transfer destination causes the occurrence of a larger traffic load on another node in the aggregate section located on the upstream side than that in the other route. The selector 152, thus, sets the propriety order of the first row to "1" while the selector 152 sets the propriety order of the second row to "2".

When receiving the packet to be transferred, the selector 152 selects the transfer destination on the basis of the priority orders in the routing table 141, and transfers the packet to the node serving as the transfer destination. For example, in the example illustrated in FIG. 6, the record in the first row has a higher priority order than that in the second row when the destination of the packet is "GW1". The selector 152, thus, selects the node 100f as the transfer destination and transfers the packet to the node 100f. As a result, the selector 152 can allocate the traffic load on the node in the aggregate section located on the upstream side of the node 100g to the node in the aggregate section located on the upstream side of the node 100f in the tree structure with the GW1 as the root.

The selector 152 may select the transfer destination in the manner described above when the number of hops specified by the GW1 is equal to the number of hops from the GW1 to the node 100 and the node 100 belongs to a specific group specified by the GW1. This can avoid an excessive increase in traffic load on a node in the aggregate section located on the upstream side of the node serving as the transfer destination in the tree structure with the GW1 as the root because of the respective nodes 100 selecting the transfer destinations simultaneously.

When specifying the number of hops and the group, the GW1 notifies the respective nodes 100 of GW advertisement frames that each include information about the number of hops and the group to be specified. The selector 152 of each node 100 checks the information about the number of hops and the group that are specified by the GW1 on the basis of the GW advertisement frame.

Figure 8:
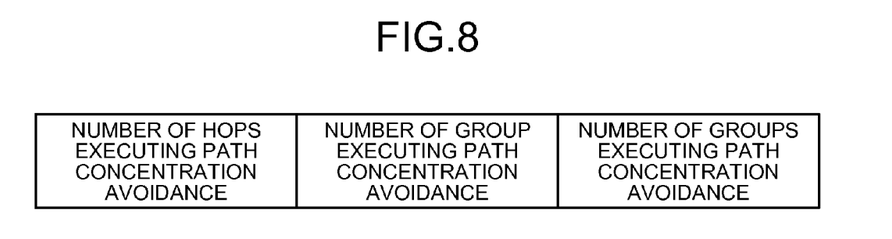
FIG. 8 is a schematic diagram illustrating an example of a data structure of a gateway (GW) advertisement frame notified by a GW in the embodiment.

FIG. 8 is a schematic diagram illustrating an example of a data structure of the GW advertisement frame notified by the GW in the embodiment. As illustrated in FIG. 8, the GW advertisement frame includes the number of hops executing route concentration avoidance, a number of the group executing route concentration avoidance, and the number of groups executing route concentration avoidance. The number of hops executing route concentration avoidance represents the number of hops from the GW1 to the node 100 that selects the transfer destination. The number of the group executing route concentration avoidance represents the number of the specific group to which the node 100 corresponding to the number of hops executing route concentration avoidance belongs. The respective nodes 100 are grouped on the basis of a value not relevant to the location of the node, such as a media access control (MAC) address or a serial number set by a server when the GW is connected. The number of the group executing route concentration avoidance stores therein such a value as the number of the specific group. The number of groups executing route concentration avoidance represents the number of groups corresponding to the number of the group executing route concentration avoidance.

Figure 9:
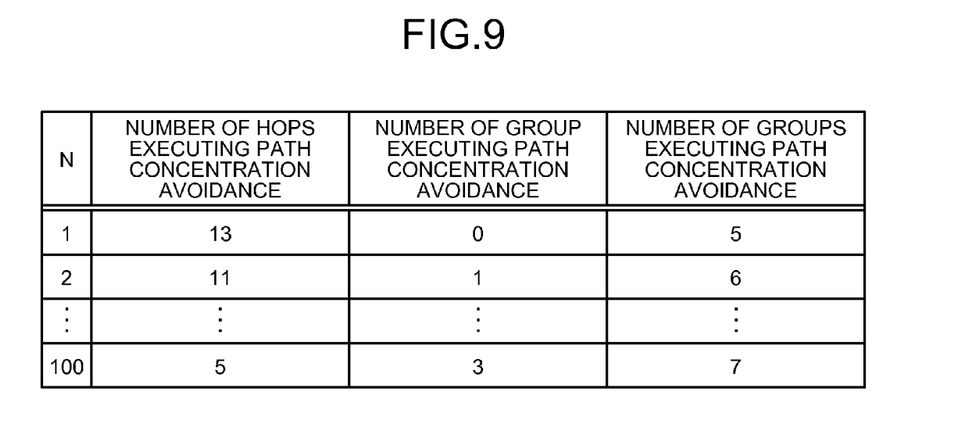
FIG. 9 is a schematic diagram to explain processing in which the GW notifies the respective nodes of the GW advertisement frames in the embodiment.

The following describes the processing in which the GW1 notifies the respective nodes 100 of the GW advertisement frames. FIG. 9 is a schematic diagram to explain the processing in which the GW notifies the respective nodes 100 of the GW advertisement frames in the embodiment. As illustrated in FIG. 9, the GW1 has a table in which the number of hops executing route concentration avoidance, the number of the group executing route concentration avoidance, and the number of groups executing route concentration avoidance are associated with one another. The GW1 produces the GW advertisement frames on the basis of the table and notifies the respective nodes 100 of the GW advertisement frames simultaneously. In the table illustrated in FIG. 9, N represents the order in which the GW1 notifies the node 100 of the GW advertisement frame. The number of hops executing route concentration avoidance represents the number of hops from the GW1 to the node 100 that selects the transfer destination. The number of the group executing route concentration avoidance represents the number of the specific group to which the node 100 corresponding to the number of hops executing route concentration avoidance belongs. The number of groups executing route concentration avoidance represents the number of groups corresponding to the number of the group executing route concentration avoidance. The GW1 sets, to the respective GW advertisement frames, the number of hops executing route concentration avoidance, the number of the group executing route concentration avoidance, and the number of groups executing route concentration avoidance included in the respective entries, in the order from N=1 to N=100 using a round robin method. The GW1 then simultaneously notifies the respective nodes 100 of the GW advertisement frames to which various types of information are set.

Figure 10:
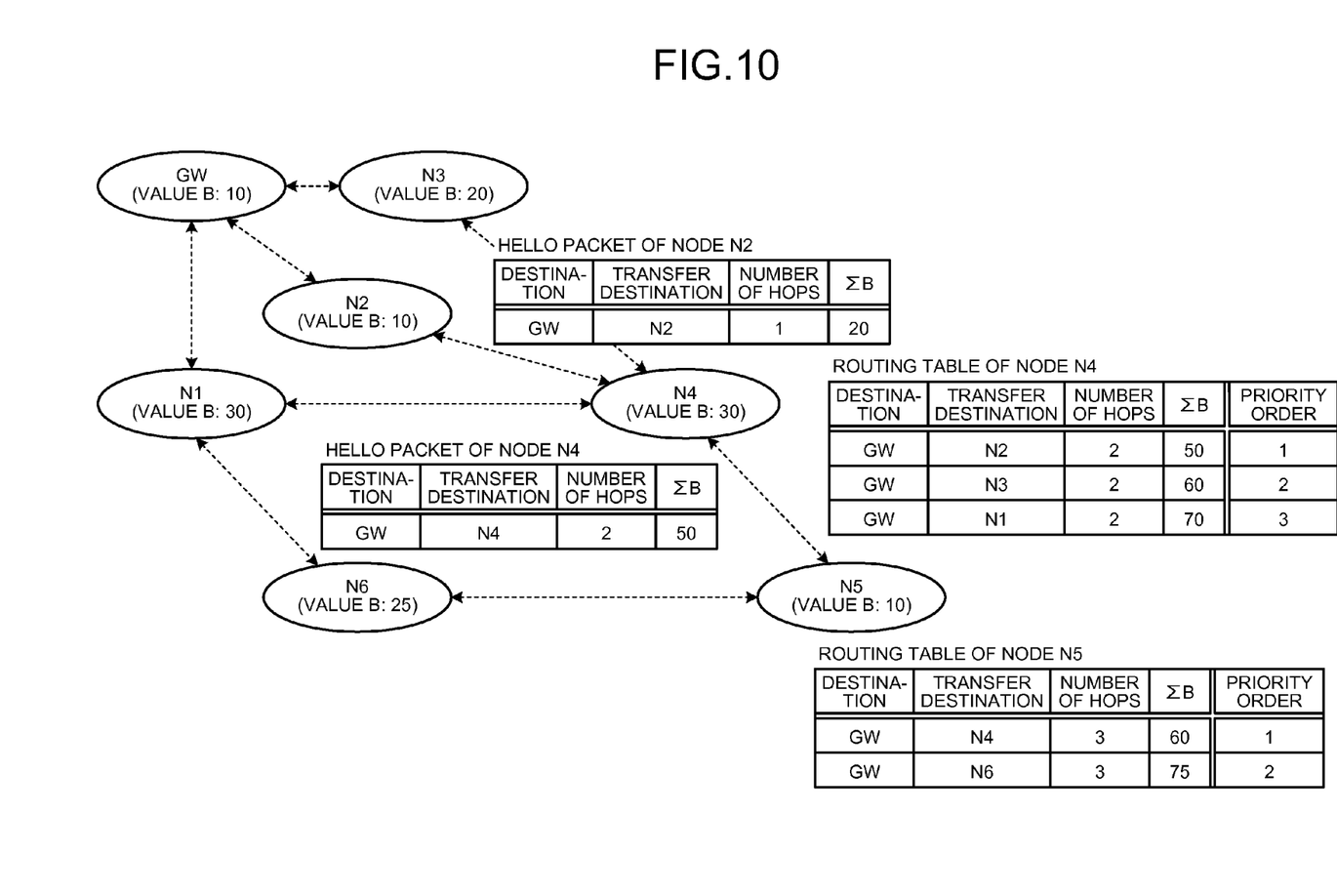
FIG. 10 is a first schematic diagram to explain an example flow of processing in which the ad hoc network including the nodes according to the embodiment selects the route having a transfer destination.
Figure 11:
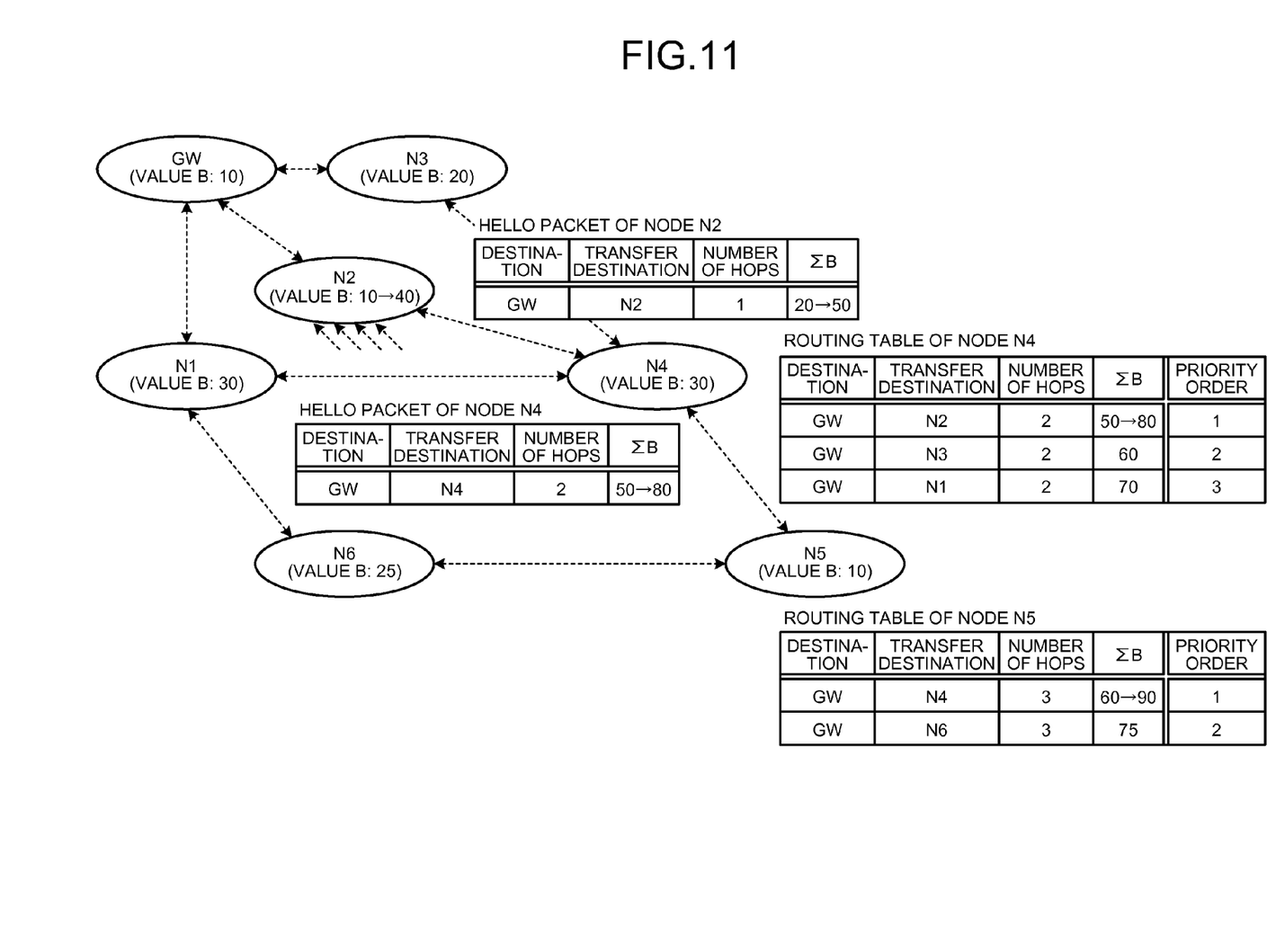
FIG. 11 is a second schematic diagram to explain an example flow of the processing in which the ad hoc network including the nodes according to the embodiment selects the route having the transfer destination.

The following describes an example of series processing in which the ad hoc network system including the nodes 100 according to the embodiment transmits and receives the hello packet, updates the routing table, and selects the transfer destination of the route. FIGS. 10 and 11 are schematic diagrams to explain an example flow of the processing in which the ad hoc network including the nodes 100 according to the embodiment selects the transfer destination of the route. Nodes N1 to N6 illustrated in FIGS. 10 and 11 correspond to the nodes 100 illustrated in FIG. 1 while a node GW illustrated in FIGS. 10 and 11 correspond to the GW1 illustrated in FIG. 1. Respective B values of the nodes N1 to N6 illustrated in FIGS. 10 and 11 represent the values of the numbers of communication nodes of the respective nodes N1 to N6.

As illustrated in FIG. 10, the node N2 transmits the hello packet. The node N4 receives the hello packet from the node N2, calculates the cumulative value "50" of the number of communication nodes B from the node GW serving as the destination to the node N4 through the adjacent node N2, and sets the cumulative value to the ΣB in the routing table 141.

Likewise, the node N4 receives the hello packet from the node N3, calculates the cumulative value "60" of the number of communication nodes B from the node GW serving as the destination to the node N4 through the adjacent node N3, and sets the cumulative value to the ΣB in the routing table 141. Likewise, the node N4 receives the hello packet from the node N1, calculates the cumulative value "70" of the number of communication nodes B from the node GW serving as the destination to the node N4 through the adjacent node N1, and sets the cumulative value to the ΣB in the routing table 141.

The node N4 receives the GW advertisement frame notified by the node GW using the round robin method. The GW advertisement frame is one that is illustrated in FIG. 8, for example. The processing in which the node GW notifies the respective nodes N1 to N6 of the GW advertisement frames is the same as that described with reference to FIG. 9, for example. The node N4 checks the information about the number of hops and the group that are specified by the node GW on the basis of the GW advertisement frame received from the node GW. When the number of hops specified by the node GW is equal to the number of hops from the node GW to the node N4 and the group number specified by the GW is equal to the group number preliminarily set to the node N4, the node N4 selects the transfer destination. Specifically, the node N4 refers to the routing table 141 and compares the values of the ΣB associated with the node GW, which is the same destination, with one another. The node N4 allocates values in ascending order from the record having the smallest value of the ΣB as the priority orders, and selects the transfer destination on the basis of the allocated priority orders. In the example illustrated in FIG. 10, the value "60" of the ΣB in the second row is larger than the value "50" of the ΣB in the first row, and the value "70" of the ΣB in the third row is larger than the value "60" of the ΣB in the second row. The node N4, thus, determines that the traffic load on the aggregate section located on the upstream side is the smallest on the communication route having the node N2 serving as the transfer destination. The node N4 sets the priority orders of the first to the third rows to "1" to "3", and selects the node N2, which has the highest priority order, as the transfer destination.

The node N4 transmits the hello packet. The node N5 receives the hello packet from the node N4, calculates the cumulative value "60" of the number of communication nodes B from the node GW serving as the destination to the node N5 through the adjacent node N4, and sets the cumulative value to the ΣB in the routing table 141.

Likewise, the node N5 receives the hello packet from the node N6, calculates the cumulative value "75" of the number of communication nodes B from the node GW serving as the destination to the node N5 through the adjacent node N6, and sets the cumulative value to the ΣB in the routing table 141.

The node N5 receives the GW advertisement frame notified by the node GW using the round robin method. The node N5 checks the information about the number of hops and the group that are specified by the node GW on the basis of the GW advertisement frame received from the node GW. When the number of hops specified by the node GW is equal to the number of hops from the node GW to the node N5 and the group number specified by the GW1 is equal to the group number preliminarily set to the N5, the node N5 selects the transfer destination. Specifically, the node N5 refers to the routing table 141 and compares the values of the ΣB associated with the node GW, which is the same destination, with one another. The node N5 allocates values in ascending order from the record having the smallest value of the ΣB as the priority orders, and selects the transfer destination on the basis of the allocated priority orders. In the example illustrated in FIG. 10, the value "75" of the ΣB in the second row is larger than the value "60" of the ΣB in the first row. The node N5, thus, determines that the traffic load on the aggregate section located on the upstream side is the smallest on the communication route having the node N4 serving as the transfer destination. The node N5 sets the priority orders of the first and the second rows to "1" and "2", respectively, and selects the node N4, which has the highest priority order, as the transfer destination.

Then, time reaches the meter-reading time, and the upstream data transmission is executed. Once the upstream data transmission is completed, the respective nodes N1 to N6 count the number of entries in the corresponding downstream routing tables to newly detect the respective own numbers of communication nodes B. As a result, the node N2 newly detects the number of communication nodes B as "40", as illustrated in FIG. 11.

The node N2 transmits the hello packet. The node N4 receives the hello packet from the node N2, calculates the cumulative value "80" of the number of communication nodes B from the node GW serving as the destination to the node N4 through the adjacent node N2, and sets the cumulative value to the ΣB in the routing table 141.

The node N4 transmits the hello packet. The node N5 receives the hello packet from the node N4, calculates the cumulative value "90" of the number of communication nodes B from the node GW serving as the destination to the node N5 through the adjacent node N4, and sets the cumulative value to the ΣB in the routing table 141.

Figure 12:
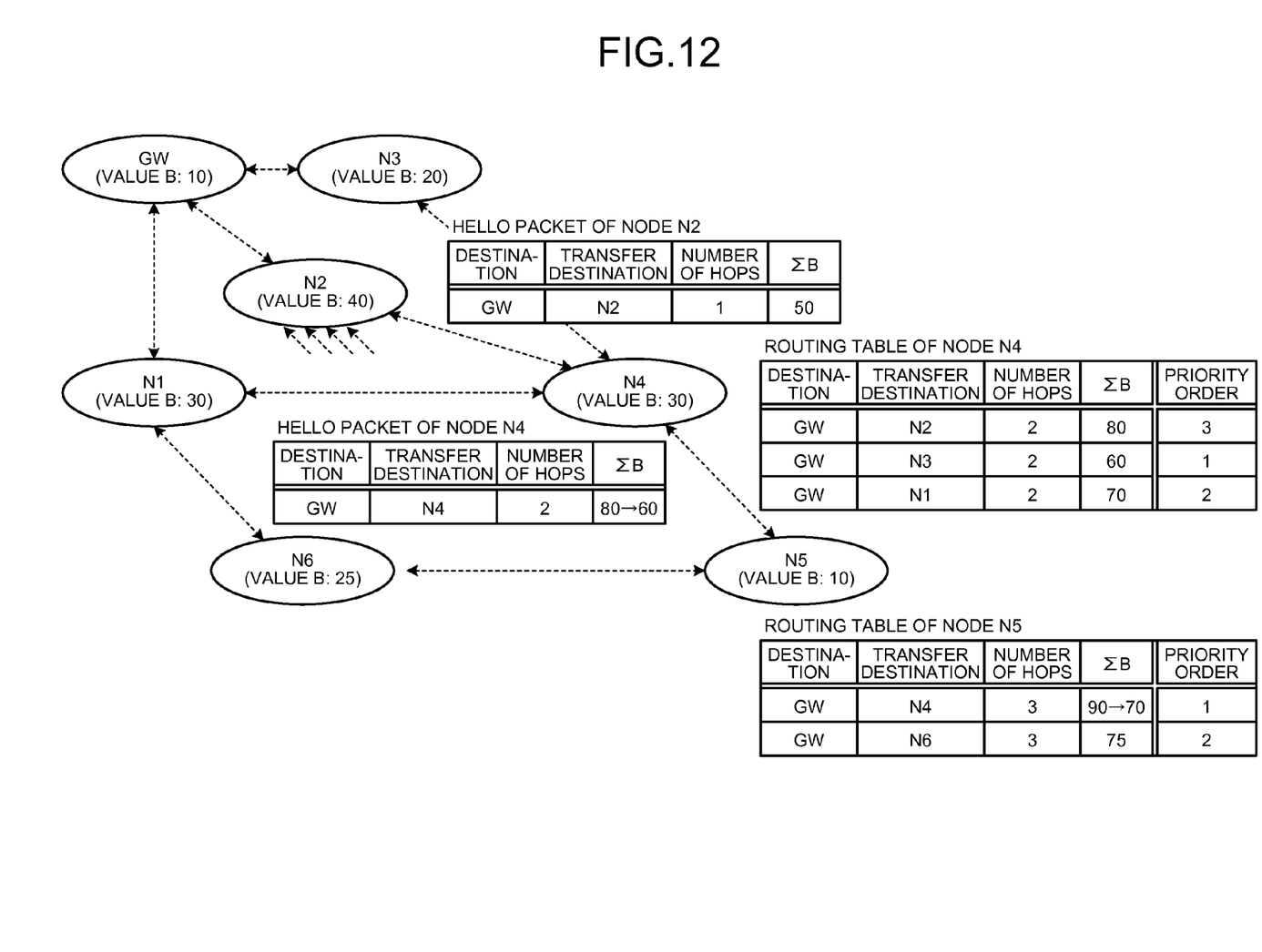
FIG. 12 is a third schematic diagram to explain an example flow of the processing in which the ad hoc network including the nodes according to the embodiment selects the route having the transfer destination.

The node N4 receives the GW advertisement frame notified by the node GW using the round robin method. The node N4 checks the information about the number of hops and the group that are specified by the node GW on the basis of the GW advertisement frame received from the node GW. When the number of hops specified by the node GW is equal to the number of hops from the node GW to the node N4 and the group number specified by the GW1 is equal to the group number preliminarily set to the N4, the node N4 selects the transfer destination. Specifically, the node N4 refers to the routing table 141 and compares the values of the ΣB associated with the node GW, which is the same destination, with one another. As illustrated in FIG. 12, the node N4 allocates again values in ascending order from the record having the smallest value of the ΣB as the priority orders and selects the transfer destination on the basis of the priority orders allocated again. In the example illustrated in FIG. 12, the value "70" of the ΣB in the third row is larger than the value "60" of the ΣB in the second row, and the value "80" of the ΣB in the first row is larger than the value "70" of the ΣB in the third row. The node N4, thus, determines that the traffic load on the aggregate section located on the upstream side is the smallest on the communication route having the node N3 serving as the transfer destination. The node N4 allocates again the priority orders of the first, the second, and the third rows to "3", "1", and "2", respectively. The node N4, then, selects the node N3, which has the highest priority order, as the transfer destination.

The node N4 transmits the hello packet. The node N5 receives the hello packet from the node N4, calculates the cumulative value "70" of the number of communication nodes B from the node GW serving as the destination to the node N5 through the adjacent node N4, and sets the cumulative value to the ΣB in the routing table 141.

The node N5 receives the GW advertisement frame notified by the node GW using the round robin method. The node N5 checks the information about the number of hops and the group that are specified by the node GW on the basis of the GW advertisement frame received from the node GW. When the number of hops specified by the node GW is equal to the number of hops from the node GW to the node N5 and the group number specified by the GW1 is equal to the group number preliminarily set to the N5, the node N5 selects the transfer destination. Specifically, the node N5 refers to the routing table 141 and compares the values of the ΣB associated with the node GW, which is the same destination, with one another. As a result of the comparison, there is no change in order of values of the ΣB. The node N5, thus, maintains the current priority orders and selects the transfer destination on the basis of the current priority orders. In the example illustrated in FIG. 12, the value of "75" of the ΣB in the second row is larger than the value "70" of the ΣB in the first row, similar to the example illustrated in FIG. 10. The node N5, thus, maintains the current priority order and selects the node N4, which has the highest priority order, as the transfer destination.

The following describes advantageous effects of the ad hoc network system according to the embodiment. The node 100 included in the ad hoc network calculates a cumulative value of the number of communication nodes from the upstream side of the node 100 to the node 100, sets the priority orders of the communication routes, and selects the node serving as the connection destination from the nodes on the upstream side when transferring a packet. As a result, the node 100 can distribute the traffic load on the aggregate section located on the upstream side of the tree structure with the GW1 as the root. For example, it is assumed that the number of communication nodes of the node 100b located on the upstream side on the communication route having the node 100g serving as the transfer destination is larger than the number of communication nodes of the node 100a located on the upstream side on the communication route having the node 100f serving as the transfer destination. In this case, the node 100 selects the node 100f as the transfer destination and can transmit the packet to the node 100f, thereby making it possible to distribute the traffic load on the node 100b to the node 100a.

The node 100 selects the transfer destination when the number of hops specified by the GW1 is equal to the number of hops from the GW1 to the node 100 and the node 100 belongs to a specific group specified by the GW1. This can avoid an excessive increase in traffic load on the node in the aggregate section located on the upstream side of the node serving as the transfer destination in the tree structure with the GW1 as the root because of the respective nodes 100 selecting the transfer destinations simultaneously.

The ad hoc network system according to an aspect of the invention has an advantage of being capable of distributing a traffic load on the aggregate section located on the upstream side in the tree structure with the GW as the root.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An ad hoc network system, comprising:
   a plurality of nodes that communicate with a specific node, each of the nodes including:
   a receiver configured to receive, from a plurality of adjacent nodes located on an upstream side, a packet that includes a cumulative value of a number of the communication nodes from the specific node to each of the plurality of the adjacent nodes, the upstream side being a side closer to the specific node than the respective node,
   a calculator configured to detect, using an upstream data transmission, a number of communication nodes located on a downstream side that is a side further from the specific node than the respective node, and to calculate, for each of the plurality of adjacent nodes, a cumulative value of the number of communication nodes from the specific node to the respective node by adding the detected number of communication nodes to the cumulative value of the number of communication nodes included in the packet, and
   a selector configured to select, as a node serving as a connection destination an adjacent node whose cumulative value of the number of communication nodes calculated by the calculator is the smallest from among the plurality of the adjacent nodes located on the upstream side.

2. The ad hoc network system according to claim 1, wherein
   each of the nodes is grouped on the basis of a value not relevant to a location of the node, and
   the selector selects the node serving as the connection destination when a number of hops specified by the specific node is equal to a number of hops from the specific node to the respective node and the respective node belongs to a specific group specified by the specific node.

3. The ad hoc network system according to claim 1, wherein the cumulative value of the number of communication nodes from the specific node to the node for each of the plurality of the adjacent nodes represents a level of a traffic load concentrated on another node located on the upstream side of each of the plurality of the adjacent nodes.

4. A route selection method that is executed by an ad hoc network system including a plurality of nodes communicating with a specific node, the route selection method comprising:
   by each of the nodes,
   detecting, using an upstream data transmission, a number of communication nodes located on a downstream side that is a side further from the specific node than the respective node,
   receiving, from a plurality of adjacent nodes located on an upstream side, a packet that includes a cumulative value of a number of the communication nodes from the specific node to each of the plurality of the adjacent nodes, the upstream side being a side closer to the specific node than the respective node,
   calculating, for each of the plurality of adjacent nodes, a cumulative value of the number of communication nodes from the specific node to the respective node by adding the numbers of communication nodes detected at the detecting to the cumulative value of the number of communication nodes included in the packet, and
   selecting, as a node serving as a connection destination, an adjacent node whose cumulative value of the number of communication nodes calculated at the calculating is the smallest from among the plurality of the adjacent nodes located on the upstream side.

* * * * *